United States Patent [19]

Dias et al.

[11] 4,064,550
[45] Dec. 20, 1977

[54] HIGH FIDELITY PRESSURE TRANSDUCER

[75] Inventors: J. Fleming Dias; Henry E. Karrer, both of Palo Alto, Calif.; Alexander Tykulsky, Carlisle, Mass.

[73] Assignee: Hewlett-Packard Company, Palo Alto, Calif.

[21] Appl. No.: 668,760

[22] Filed: Mar. 22, 1976

[51] Int. Cl.$^2$ .......................... H01G 7/00; H01G 5/16
[52] U.S. Cl. .................................. 361/283; 73/398 C; 361/278
[58] Field of Search ......... 73/398 C; 317/246, 249 R, 317/249 D; 174/50.61; 361/283, 290, 278; 324/61 P

[56] References Cited
U.S. PATENT DOCUMENTS

| 227,370 | 5/1908 | Man | 174/50.61 |
| 3,202,899 | 8/1965 | Matsui | 317/249 D |
| 3,748,571 | 7/1973 | Kurtz | 317/246 X |
| 3,858,097 | 12/1974 | Poyle | 317/246 X |
| 3,949,246 | 4/1976 | Lohrmann | 317/249 R |
| 3,952,234 | 4/1976 | Birchall | 317/246 |

FOREIGN PATENT DOCUMENTS 2,021,479  11/1971  Germany ........................ 73/398 C Primary Examiner—Elliot A. Goldberg
Attorney, Agent, or Firm—F. D. LaRiviere

[57] ABSTRACT

The capacitive fluid pressure transducers described herein comprise quartz bodies and diaphragms having suitable electrodes deposited thereon to form both sensing and reference capacitors in appropriate configurations for high fidelity measurement of relative blood pressure, said transducers being substantially unaffected by temperature and other environment factors.

4 Claims, 13 Drawing Figures

4,064,550

HIGH FIDELITY PRESSURE TRANSDUCER

BACKGROUND OF THE INVENTION

Blood pressure is the most frequently measured quantity in medical physiological practice. The methods of measuring systemic blood pressure are either invasive or noninvasive. The most commonly known noninvasive method (Riva-Rocci Method) uses a cuff and sphygmomanometer to determine the maxima and minima of pressure commonly referred to as the systolic and diastolic pressure. Interpretation of the cessation and reappearance of Korotkow sounds for estimating systolic and diastolic pressure values is very subjective and improved methods become necessary is more information is to be extracted from the pressure pulsations.

Invasive methods provide more information but require that the blood vessel be punctured. Using this method, the transducer is placed inside the vessel or outside the vessel and connected to it via tubing. For true fidelity of the pressure pulse, the transducer should be as close to the puncture as possible using the shortest length of tubing. Therefore, the transducer must be small and should have a stiff diaphragm and be ruggedly constructed.

Transducers capable of measuring blood pressure are usually capable of converting pressure energy, i.e. force per unit area, into a proportional displacement. This displacement in turn can be made to vary an inductance, a capacitance or a resistance. The inductive and resistive type transducers are relatively unstable with temperature, and, moreover, the inductive type is sensitive to vibrations. While the capacitive transducer is generally difficult to produce, it is very rugged and reliable.

SUMMARY OF THE INVENTION

The capacitive transducer of the present invention is stable and more readily producible. One embodiment is made of fused quartz, comprising a diaphragm and a body which are very flat. The body of the transducer has an ion-milled cavity. Using well-known thin film deposition techniques, suitable electrodes are deposited on the diaphragm and body, and, on the periphery of these parts, a eutectic brazing alloy is also vacuum deposited. Using improved brazing techniques, these parts are brazed together to form a sensing capacitor ($C_S$). The capacitance of $C_S$ changes as a function of the pressure applied to the diaphragm. The body is provided with appropriate venting to measure blood pressure relative to atmospheric pressure, (i.e. gage pressure rather than absolute pressure).

In another embodiment, the diaphragm includes a second electrically-isolated annular electrode to form a reference capacitor ($C_R$) with the common electrode of the body. The capacitance of $C_R$ changes very little as the diaphragm deflects and its temperature coefficient (TC) is closely matched to the TC of $C_S$. $C_S$ and $C_R$ are coupled to appropriate circuitry for processing of an electrical signal which varies in proportion to changes in $C_S$ for providing indication of fluid pressure having substantially improved linearity and temperature stability.

DESCRIPTION OF THE PREFERRED EMBODIMENT

Figure 1:
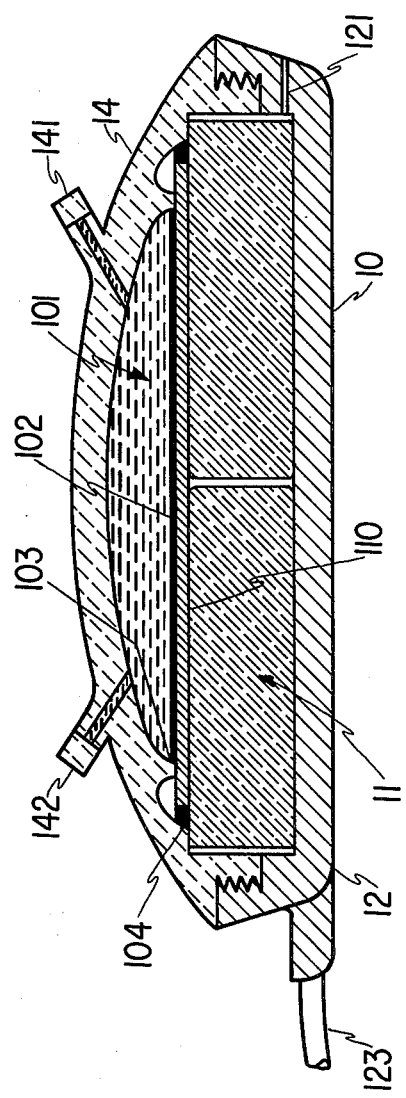
FIG. 1 is a cross-sectional view of an enclosed capacitive blood pressure transducer constructed according to one embodiment of the present invention.
Figure 2:
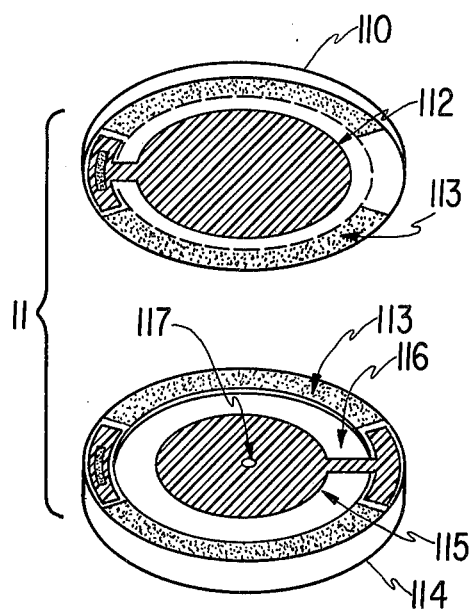
FIG. 2 is an exploded view of one embodiment of the capacitive blood pressure transducer of FIG. 1.

Referring to FIGS. 1 and 2, transducer 11 is housed in enclosure 10 which includes base 12 having vent 121 and replaceable dome 14 having ports 141 and 142. Transducer 11 comprises body 114 having electrode 115 of chromium (Cr) and gold (Au) deposited in etched recess 116 thereof and air vent 117 therethrough, and diaphragm 110 having electrode 112 deposited thereon. Diaphragm 110 and body 114 are constructed of fused quartz, of course, any other material having the same or similar physical and electrical properties may be used. A band of brazing alloy 113 is deposited along the rim of both body 114 and diaphragm 110. The nature of brazing alloy band 113 and the reasons therefor are described later in this specification.

Cavity 101, formed by dome 14 and diaphragm 110, is sealed by pliable membrane 102 which covers dielectric 104 and seal 103 in order to contain saline solution. The saline solution is supplied via port 141. Port 142 receives pressure fluctuations via a catheter, such fluctuations are then being transmitted to diaphragm 110 via the saline solution, membrane 102 and dielectric 104.

Diaphragm 110 and body 114 are formed using ion-milling or sputter-etching techniques or the like. These new techniques make it possible to etch very shallow recesses (referring to recess 116, for example) in quartz material to form very thin gaps between two electrodes deposited thereon. Thus, quartz capacitors having large initial capacitance values are producible. Prior art capacitors have been limited to values on the order of 1 to 10 pf, whereas capacitors of approximately 200 pf are now possible. The availability of quartz capacitors having large values is important since the effects of stray capacitance on the performance of a capacitive transducer is minimized. The etched surfaces are, for all practical purposes, as good as the original polished surface of the quartz, which makes it possible to deposit high quality thin film electrodes directly on the etched surface.

The band of eutectic alloy of tin and gold is used to braze diaphragm 110 to body 114. These metals are vacuum deposited as thin films on the fused quartz through suitable stainless steel masks. The brazing is done in vacuum, by applying a force to the periphery of diaphragm 110 after mating it with body 114 and simultaneously heating the parts to about 200° C for approximately 45 minutes and then gradually increasing the temperature to about 260° C for another 45 minutes. The assembled transducer is then gradually cooled. The load that is applied during brazing tends to put a peripheral bending moment on the diaphragm which minimizes the chances of shorting the electrodes of the transducer. Thus, electrode 112 is capacitively coupled to electrode 115.

Figure 3A:
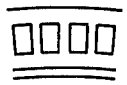
FIG. 3A is an arc of the periphery of the diaphragm of the transducer of FIG. 1 showing one pattern of segmented brazing allow band.
Figure 3B:
FIG. 3B is an arc of the periphery of the diaphragm of the transducer of FIG. 1 showing another pattern of segmented brazing alloy band.
Figure 3C:
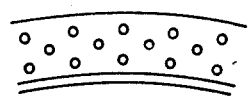
FIG. 3C is an arc of the periphery of the diaphragm of the transducer of FIG. 1 showing another pattern of segmented brazing alloy band.
Figure 3D:
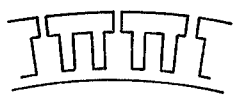
FIG. 3D is an arc of the periphery of the diphragm of the transducer of FIG. 1 showing another pattern of segmented brazing alloy band.

The brazing alloy is typically deposited on a continuous band of given width and thickness around the periphery of the parts to be assembled. However, such a band of brazing alloy may cause excessive stresses on quartz material during the brazing process owing to TC mismatch. Such excessive stresses often crack or at least deform the parts, particularly diaphragm 110. Deformation of diaphragm 110 in turn causes nonlinear performance as a pressure indicator which is discussed later in this specification. In order to minimize these stresses, brazing alloy 113 is deposited in a segmented pattern which provides substantially uniform clamping of diaphragm 110 to body 114. Various segmented brazing alloy band patterns are shown in FIGS. 3A and 3D.

Reduction of thermal stresses affects other temperature sensitive parameters like thermal zero shift and temperature coefficient of sensitivity. In addition, a segmented braze band provides the equivalent of a wide braze in that, when assembled, diaphragm 110 and body 114 approximate a homogeneous quartz transducer. A wide braze band is necessary to provide an area where the enclosure for the transducer can bear upon without affecting the thermal zero shift significantly. Moreover, segmentation reduces the chances of some braze alloy flowing into adjoining areas when the parts are brazed. While discrete clamps between the transducer and body result, they have uniform strength along the periphery of the transducer.

Figure 4:
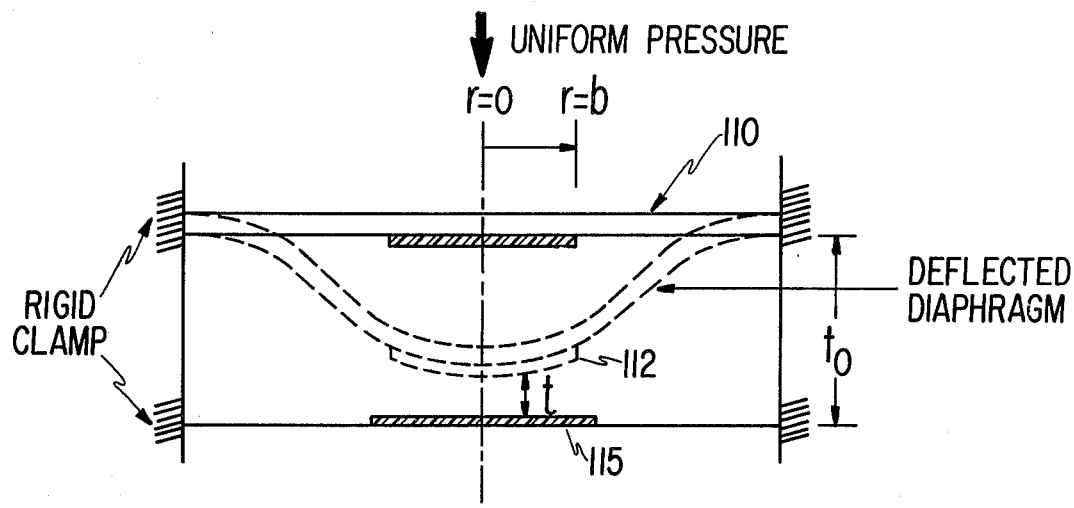
FIG. 4 is a cross-sectional view of the transducer of FIG. 1 showing the diaphragm in deflected configuration.

Referring to FIG. 4, the capacitance of this transducer is given by $$C_S = K_1 (A/t) \quad (1)$$

where
$A$ = area of the smallest electrode
$t$ = separation between electrodes.
Ideally electrode movement in response to pressure is linear. Therefore, electrode separation is $$t = t_o - K_2 P \quad (2)$$

where $t_o$ = separation between electrodes with no pressure applied.
And then using (1) and (2)

$$C_S = \frac{K_1 A}{t_o - K_2 P} \quad (3)$$

or

-continued $$P = t_o \left(1 - \frac{K_1 A}{t_o C_S}\right)$$

or $$P = K_3 \left(1 - \frac{C_{SO}}{C_S}\right)$$

Since $C_S = C_{SO}$ when $P = 0$
and if, furthermore, some form of signal processing electronics is included that gives an output voltage of the form:

$$e = K_4 \left(1 - \frac{C_{SO}}{C_S}\right) \quad (4)$$

then $e$ = constant $x$ applied pressure $P$.

Thus, an output voltage "$e$" that varies linearly with $P$ depends on an ideal capacitor whose electrodes remain parallel as the pressure is applied.

The present invention closely approximates the ideal parallel plate capacitor concept by using a clamped diaphragm as shown in FIG. 4. FIG. 4 also shows the diaphragm of the transducer in a deflected configuration. The separation of electrodes depends on deflection of the clamped diaphragm, but that separation is no longer related to the applied pressure in a simple fashion, owing to the deformation of the plane of the electrode. While the deflection itself is not uniform across the diameter of diaphragm electrode 112, it is a predictable function of the pressure and depends on the elastic properties of the material of the diaphragm, on its diameter and thickness and on the quality of the diaphragm clamp.

Since the separation of the deflected electrodes is not constant, the total capacitance corresponding to a given applied pressure is obtained using equation (1) and integrating infinitesimal capacitances from $r = o$ to $r = b$. The following functional relationship for the capacitance versus pressure results.

$$C = \frac{K_a}{\sqrt{P}} \ln \frac{K_b P + K_c \sqrt{P} - K_d}{K_b P - K_c \sqrt{P} - K_d} \quad (5)$$

where $K_a$, $K_b$, $K_c$ and $K_d$ are functions of the gap size, thickness and diameter of the diaphragm, its elastic properties and the size of the electrodes. In the limit according to L'Hospital's rule, as $P$ approaches 0, this nonlinear expression reduces to equation (1), and mathematically approximates the performance of the transducer of FIG. 2.

Figure 5A:
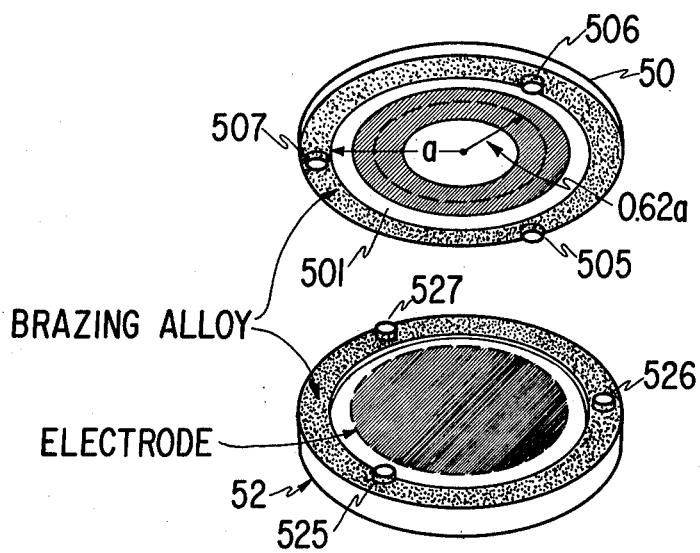
FIG. 5A is an exploded view of another embodiment of the transducer of FIG. 1.
Figure 5B:
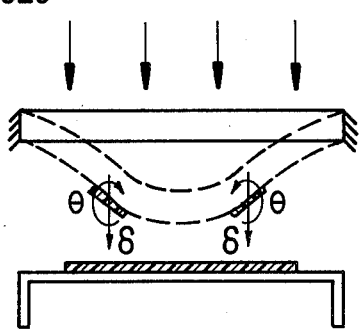
FIG. 5B is a cross sectional view of the transducer of FIG. 5A showing the diaphragm in deflected configuration.

Improved linearity can be achieved by using annular electrode 501 on diaphragm 50 as shown in FIGS. 5A and 5B. From the well-known theory of clamped diaphragms having a radius $a$, at the inflection circle or at a radius of 0.63$a$, the curvature of a deflected diaphragm changes sign as shown in FIG. 5B. If an annular ring shaped electrode is placed substantially on the inflection circle of the diaphragm, then the variations in capacitance due to rotation (i.e. deformation of the plane of the electrode) are reduced and the behavior of the transducer will be more linear and proportional to 1/C (i.e. the capacitance will tend to change more as a function of the vertical translation δ). The sensitivity of this transducer is, however, reduced because the deflection for the same pressure is less since the deflection near the clamped edge is extremely small.

As stated earlier for similar value capacitors, the nonlinearity is lower for the annular sensing electrode capacitor. In applications like phonocardiography where faithful reproduction of heart sounds is a necessity, linearity of the transducer is extremely important.

In FIG. 5A, pedestals 505, 506, 507, 525, 526 and 527 have been created by ion milling or sputter etching. The height of the pedestals is equal to the gap of the capacitive transducer. All round these pedestals the braze alloy is deposited. When diaphragm 50 and body 52 are brazed, the pedestals touch the opposite part and diaphragm 50 is clamped evenly along the periphery and separated from the body by the height of the pedestals.

Figure 6:
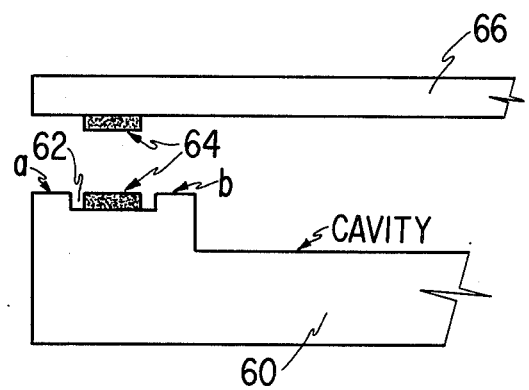
FIG. 6 is a cross-sectional view of the transducer of FIG. 5 showing another brazing and assembly configuration.

FIG. 6 shows yet another way of constructing this transducer. Here channel 62 has been etched along the periphery of body 60 in which braze band 64 is deposited. The diaphragm also carries an equivalent band of alloy. When diaphragm 66 is brazed to body 60 as described earlier, the diaphragm 66 sits flat on the sides of channel 62 and the bands fuse to provide the necessary clamp. The advantage of this design is that the transducer is substantially immune to external forces at points "a" and "b" and the integrity of transducer performance is preserved. Such forces could originate from a transducer enclosure of the type shown in FIG. 1.

Figure 7A:
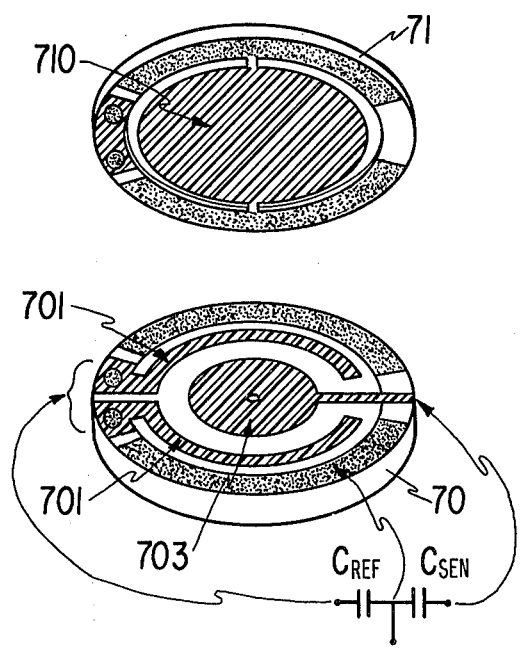
FIG. 7A is an exploded view of another embodiment of the transducer of FIG. 1.

In many pressure sensing systems where a capacitive transducer is used, a fixed capacitor which is invariant with pressure is used as a reference. Such a reference capacitor can be external to the transducer but its temperature coefficient should match that of the sensing capacitor if subjected to the same environment. External capacitors having values of TC in the order of 10 ppm/° C are not easy to obtain and their size is not small. Thus, the capacitive transducer as shown in FIG. 7A includes a $C_S$ constructed according to the configuration of FIG. 2 and, recalling that the deflection at or near the clamped edge of the diaphragm is extremely small, $C_R$ constructed according to the configuration of FIG. 5B but nearer the clamped edge. $C_S$ comprises electrode 703 on diaphragm 70 and common electrode 710 on body 71, and $C_R$ comprises electrodes 701 on diaphragm 70 and common electrode 710.

The capacity of this $C_R$ changes very slightly with pressure, but the variation is not large enough to affect the linearity significantly. Furthermore, this reference capacitor has a TC closely matched to the TC of the sensing capacitor and is provided in a convenient size and configuration.

It should be noted that the sensitivity of the circuit formed by the sensing and reference capacitors may depend on the ratio of the values of these capacitors. In this scheme these capacitors always maintain substantially the same ratio, and that ratio is independent of the cavity etched in the body of the transducer.

Figure 7B:
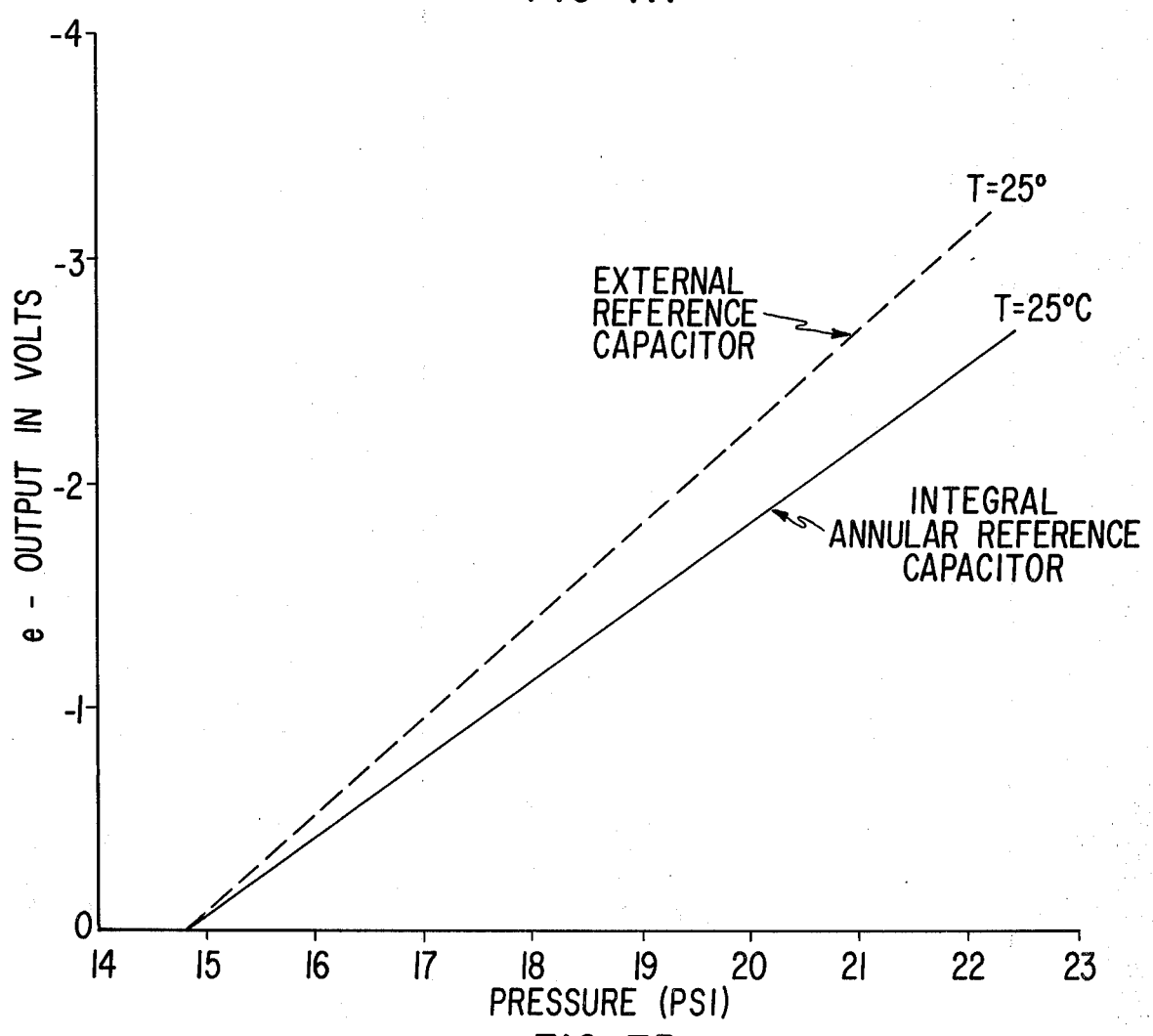
FIG. 7B is a plot of the electrical output of the transducer of FIG. 7A versus pressure.

Measured data on a transducer using an annular reference capacitor is shown in FIG. 7B, where the electrical output of a suitable interface circuit is plotted as a function of the pressure. For comparison a plot using an external reference capacitor is also shown. While linearity is not degraded, the sensitivity is slightly lower because unlike the model, the reference capacitor does change with pressure.

Figure 8:
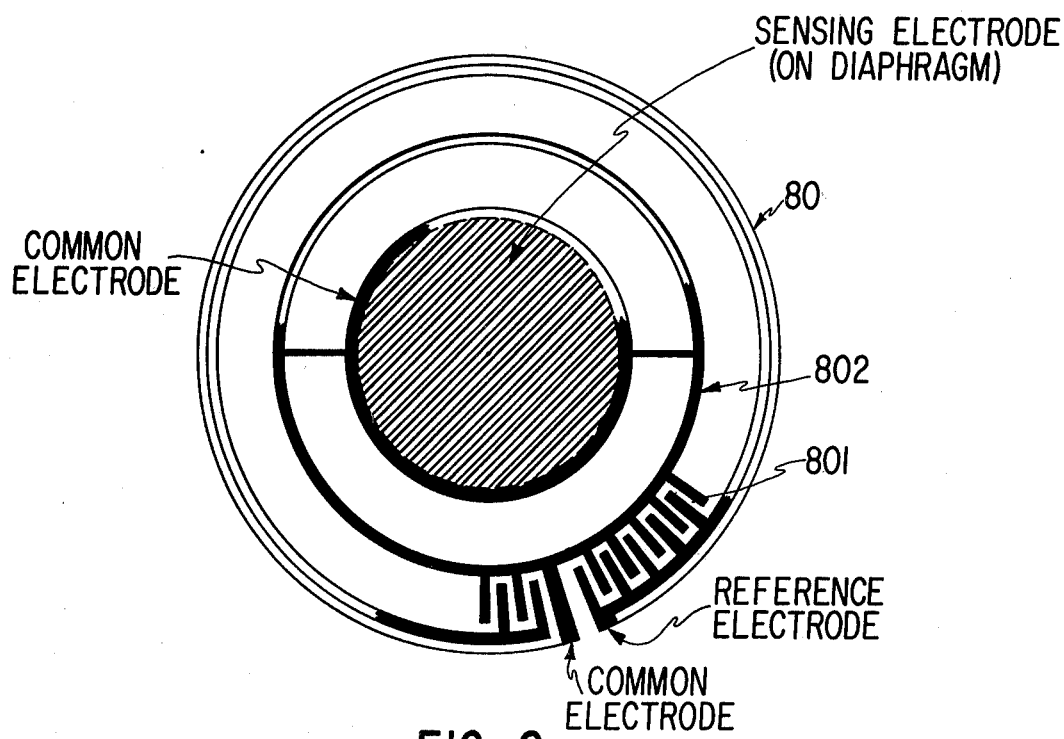
FIG. 8 is a top view of an interdigital reference capacitor.

When it is desirable to have a reference capacitor that is invariant with pressure, then the scheme shown in FIG. 8 may be used. Here planar reference capacitor 801 is formed on body 80 by using interdigitated fingers as plates of the capacitor, and common electrode 802 is located in the center portion of body 80 in a manner similar to previous configurations. To obtain a capacity of 50 pf, several hundred 0.1 inch long fingers are necessary. The capacitance between interdigitated fingers is a function of length of fingers L, the dielectric constant $E_r$ of the base material, the ratio of the width of fingers to the space between them and to the total number of fingers N. Very approximately, when the width is equal to the space, the capacity is given by, $$C \simeq 4.5 L (1 + E_r) (N - 1)$$

The formation of these fingers can be done using conventional photolithographic and thin film deposition techniques. Since the capacitor is formed on one surface of the body, it is invariant with pressure.

We claim:
1. A fluid pressure transducer comprising:
   a quartz body having a body electrode of electrically conductive material; and
   a deflectable quartz diaphragm peripherially coupled to the body and having a ring shaped sensing electrode of electrically conductive material disposed on and substantially limited to the inflection circle of the diaphragm for capacitive coupling with the body electrode to form a sensing capacitor;
   said diaphragm being deflected by fluid pressure fluctuations to change the capacitance of the sensing capacitor in substantially linear proportion to such fluctuations.
2. A fluid pressure transducer as in claim 1 wherein the body electrode is located in a shallow recess of the quartz body.
3. A fluid pressure transducer as in claim 1 wherein a plurality of pedestals are disposed along the periphery of the diaphragm and the body and the separation therebetween is determined by the height of the pedestals.
4. A fluid pressure transducer as in claim 1 wherein the body and diaphragm include bands of eutectic alloy disposed along the peripheries thereof for coupling said body to said diaphragm by brazing said bands together.
5. A fluid pressure transducer as in claim 4 wherein the bands of eutectic alloy include electrical contacts coupled to the body and sensing electrodes, respectively, and located along the periphery of each of said body and said diaphragm, for connecting electrical signal conductors thereto.

* * * * *

UNITED STATES PATENT AND TRADEMARK OFFICE
CERTIFICATE OF CORRECTION

PATENT NO. : 4,064,550
DATED : December 20, 1977
INVENTOR(S) : J. Fleming Dias, Henry E. Karrer and Alexander Tykulsky It is certified that error appears in the above-identified patent and that said Letters Patent are hereby corrected as shown below:

Column 2, line 43, after "quartz," insert --but--;

Column 4, line 62, after "annular" insert --or--.

Signed and Sealed this

Seventeenth Day of October 1978

[SEAL]

Attest:

RUTH C. MASON
Attesting Officer

DONALD W. BANNER
Commissioner of Patents and Trademarks